(12) United States Patent
Choi

(10) Patent No.: US 11,613,476 B1
(45) Date of Patent: Mar. 28, 2023

(54) PHYSICOCHEMICAL WATER TREATMENT PROCESS USING MICROFIBER FILTER COATED WITH COAGULANT

(71) Applicant: ROPEN Co., Ltd., Hwaseong-si (KR)

(72) Inventor: Choong Hyun Choi, Suwon-si (KR)

(73) Assignee: ROPEN Co., Ltd., Hwaseong-si (KR)

( * ) Notice: Subject to any disclaimer, the term of this patent is extended or adjusted under 35 U.S.C. 154(b) by 0 days.

(21) Appl. No.: 17/964,042

(22) Filed: Oct. 12, 2022

(30) Foreign Application Priority Data

Mar. 23, 2022 (KR) .................. 10-2022-0036236

(51) Int. Cl.
C02F 1/00 (2023.01)
C02F 1/24 (2023.01)
C02F 1/28 (2023.01)

(52) U.S. Cl.
CPC ............. *C02F 1/001* (2013.01); *C02F 1/24* (2013.01); *C02F 1/288* (2013.01); *C02F 2209/03* (2013.01); *C02F 2301/066* (2013.01)

(58) Field of Classification Search
CPC .......... C02F 1/001; C02F 1/24; C02F 1/288; C02F 2209/03; C02F 2301/066
See application file for complete search history.

(56) References Cited

FOREIGN PATENT DOCUMENTS

| CN | 101219846 A | * | 7/2008 | |
|---|---|---|---|---|
| JP | 4800463 B2 | | 10/2011 | |
| KR | 10-0241198 B1 | | 2/2000 | |
| KR | 10-2002-0094097 A | | 12/2002 | |
| KR | 2004096085 A | * | 11/2004 | ......... B01D 29/0027 |
| KR | 10-1879845 B1 | | 7/2018 | |
| KR | 10-2019-0025327 A | | 3/2019 | |

* cited by examiner

*Primary Examiner* — Terry K Cecil
(74) *Attorney, Agent, or Firm* — Revolution IP, PLLC

(57) ABSTRACT

The present disclosure provides a physicochemical water treatment process using a microfiber filter coated with a coagulant, including: a) performing a pressurized filtration by supplying raw water to an upper portion of a pressurized microfiber filtering device including a microfiber filter coated with a coagulant; b) backwashing the microfiber filter by supplying backwashing water and air from a lower portion of the microfiber filtering device; and c) after the backwashing of the microfiber filter is completed, coating the microfiber filter with the coagulant by supplying the coagulant together with the backwashing water, wherein backwashing wastewater of the pressurized microfiber filtering device is concentrated by the suction type microfiber filter coated with the coagulant and transferred to a dehydrator.

5 Claims, 5 Drawing Sheets

PHYSICOCHEMICAL WATER TREATMENT PROCESS USING MICROFIBER FILTER COATED WITH COAGULANT

CROSS-REFERENCE TO RELATED APPLICATION

This application claims priority under 35 U.S.C. § 119(a) to Korean Patent Application No. 10-2022-0036236 filed on Mar. 23, 2022, the disclosure of which is incorporated herein by reference in its entirety.

BACKGROUND OF THE INVENTION

(a) Technical Field

The present disclosure relates to a physicochemical water treatment process, and relates to a technology for replacing the existing coagulating bath, mixing bath, sedimenting bath, and sand filtering bath with one pressurized microfiber filtering device including a microfiber filter coated with a coagulant.

(b) Background Art

A physical treatment processing such as sedimentation and filtration has been used as a main treatment method or an auxiliary treatment method in a treatment processing of purified water, sewage, or wastewater. Fine particles including dissolved colloidal particles that are not separated by sedimentation and filtration methods are treated by a physical treatment such as sedimentation and filtration after the coagulation and coarsening by a coagulant, which is a chemical treatment processing.

In the coagulation processing, the coagulant reduces the thickness of a surface charge double layer of the fine colloid to help the coagulation of the colloidal particles. Therefore, the efficiency of the coagulation may vary depending on the number of collisions between the coagulant and the colloidal particles by stirring and mixing, pH, alkalinity, and oxidation number of the coagulant.

Therefore, for the optimum coagulation, it is necessary to increase the number of collisions between the colloidal particles and the coagulant by mixing the coagulant and raw water and stirring strongly. However, when low-concentration (turbidity) raw water is introduced, the absolute number of colloidal particles is insufficient, and thus, there are problems that the dosage of the coagulant is injected excessively, and the coagulation is not successful even when the mixing and stirring time is long.

Further, there are problems that the sedimentation processing used to separate the coagulated products after the coagulation requires a large site, and a pressurizing-floating method requires excessive energy and chemicals.

Further, there are problems that water purification, sewage, and wastewater treatment plants to which a physicochemical treatment processing in the related art is applied require a large area, a large amount of sludge is generated, and maintenance is difficult.

PRIOR ART DOCUMENTS

Patent Documents (Patent Document 1) Korean Patent Registration No. 10-1879845
(Patent Document 2) Korean Patent Registration No. 10-0241198

SUMMARY OF THE INVENTION

The present invention has been devised to solve the problems in the related art described above, and is to provide a physicochemical water treatment process that
allows a chemical treatment with a much lower amount of coagulant than the coagulation processing in the related art;
realizes the coagulation and sedimentation (or flotation) in real time in one filtering device, thereby greatly reducing the required area;
allows to omit additional filtration treatments after the coagulation and sedimentation (flotation) treatments, which are essentially required in the chemical processing in the related art;
is not necessary to consume excessive energy and chemicals due to pressurizing-floating;
allows an efficient water treatment by preventing problems such as poor coagulation or poor sedimentation when low-concentration (low-turbidity) raw water is introduced; and
is easy to maintain.

In order to achieve the goal discussed above, the present disclosure provides a physicochemical water treatment process using a microfiber filter coated with a coagulant including:
a) performing a pressurized filtration by supplying raw water to an upper portion of a pressurized microfiber filtering device including a microfiber filter coated with a coagulant;
b) backwashing the microfiber filter by supplying backwashing water and air from a lower portion of the microfiber filtering device; and
c) after the backwashing of the microfiber filter is completed, coating the microfiber filter with a coagulant by supplying the coagulant together with the backwashing water.

The physicochemical water treatment process using the microfiber filter coated with the coagulant according to the present disclosure provides the following effects:
first, since a small amount of the coagulant is used for coating the fiber for backwashing cycle, a chemical treatment with a much lower amount of coagulant than the coagulation processing in the related art is possible;
second, the required area may be greatly reduced by realizing the coagulation and sedimentation (or flotation) in real time in one filtering device;
third, although additional filtration treatments after the coagulation and sedimentation (flotation) treatments are required in the chemical processing in the related art, such treatments may be omitted;
fourth, it is not necessary to consume excessive energy and chemicals due to pressurizing-floating;
fifth, since problems such as poor coagulation or poor sedimentation when low-concentration (low-turbidity) raw water is introduced are prevented, an efficient water treatment is possible; and sixth, maintenance is easy.

DETAILED DESCRIPTION OF THE EMBODIMENTS

Hereinafter, the present disclosure will be described in detail with reference to the drawings.

Figure 1:
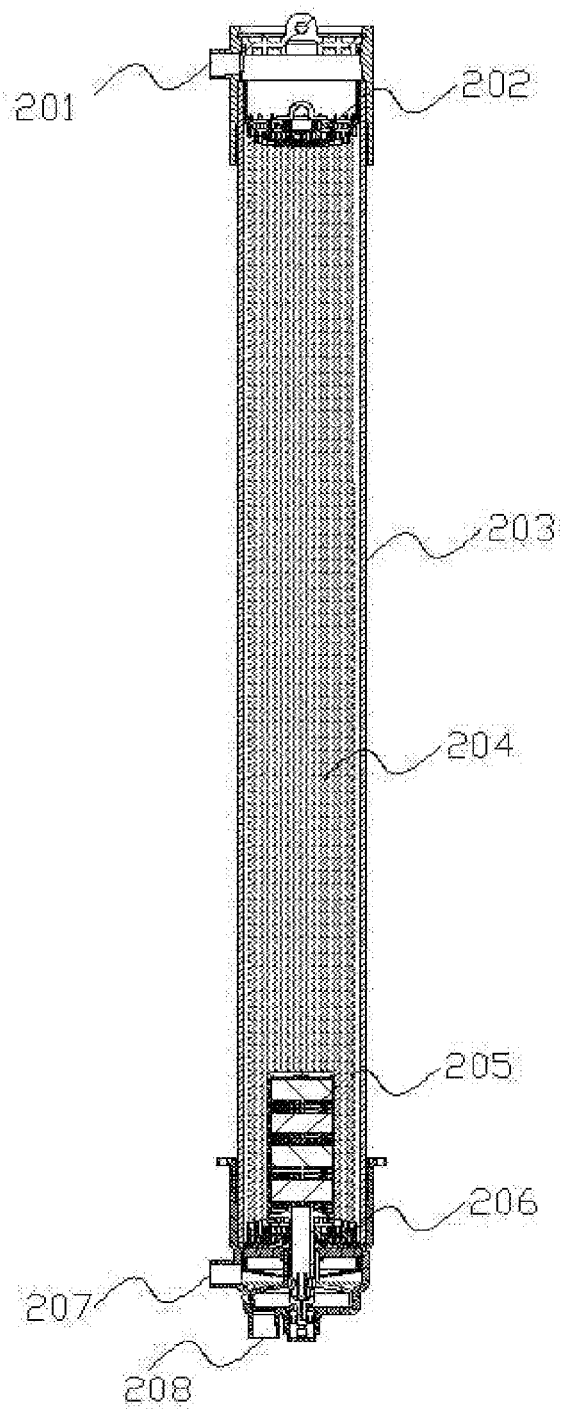
FIG. 1 is a view schematically illustrating a pressurized microfiber filtering device module including a microfiber filter coated with a coagulant as an embodiment of the present disclosure.
Figure 2:
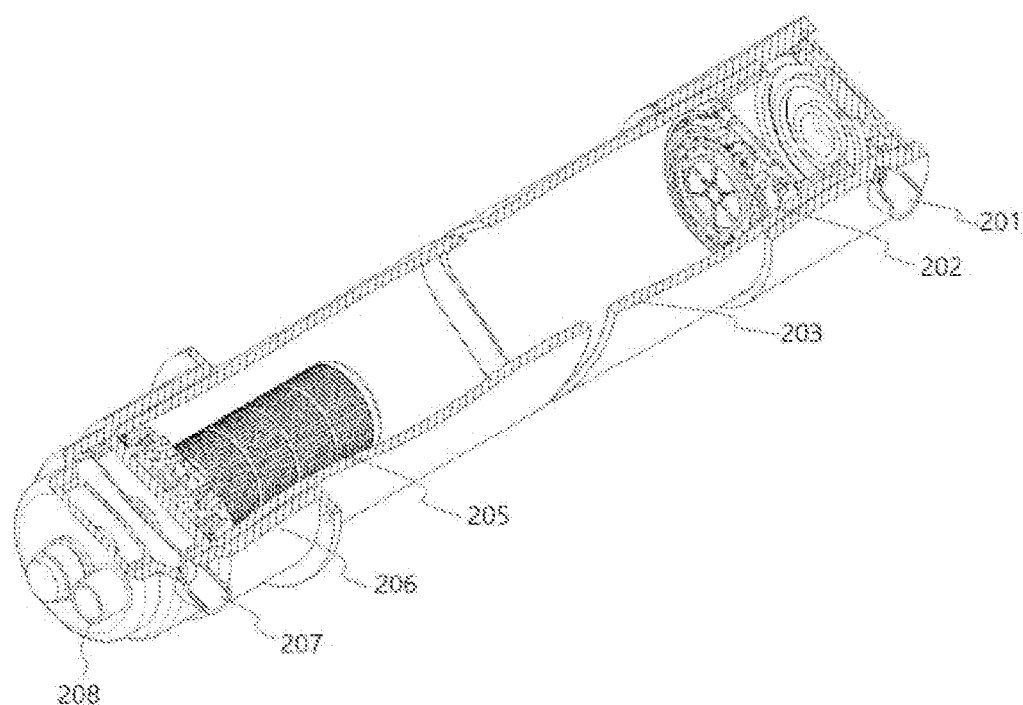
FIG. 2 is a cut-away perspective view of the pressurized microfiber filtering device module (not illustrating the microfiber filter) as an embodiment of the present disclosure.

First, the present disclosure will be described with reference to FIG. 1 schematically illustrating a pressurized microfiber filtering device module including a microfiber filter coated with a coagulant and FIG. 3 relating to a water treatment system that can be applied to a physicochemical water treatment process according to the present disclosure.

The physicochemical water treatment process using the microfiber filter coated with the coagulant according to the present disclosure is characterized by including the following steps:

a) performing a pressurized filtration by supplying raw water to an upper portion 201 (raw water supply port) of a pressurized microfiber filtering device including a microfiber filter 204 coated with a coagulant;

b) backwashing the microfiber filter by supplying backwashing water 411 and air 412 from a lower portion of the microfiber filtering device 103; and c) after the backwashing of the microfiber filter 204 is completed, coating the microfiber filter 204 with the coagulant by supplying the coagulant together with the backwashing water.

The physicochemical water treatment process according to the present disclosure is characterized in that above steps a) to c) are repeatedly performed.

The microfiber filter 204 coated with the coagulant in step a) may be the microfiber filter 204 coated with the coagulant by performing the same step as step c) in the previous process. Of course, the microfiber filter 204 coated with the coagulant may be assembled in a form coated with the coagulant in advance when configuring the pressurized microfiber filtering device.

The microfiber filter 204 is not particularly limited as long as a filter is made of a microfiber. For example, a form in which microfibers are woven, or a form in which a plurality of microfibers is tightly arranged may be used.

The pressurized microfiber filtering device may have a structure known in the art. That is, the present disclosure is not characterized in the structure of the pressurized microfiber filtering device, but is characterized in the use of the pressurized microfiber filtering device including the microfiber filter 204 coated with or not coated with a coagulant according to a process. Therefore, the structure of the pressurized microfiber filtering device that is not coated with the coagulant may be the same as the structure known in the art (e.g., Korean Patent Registration No. 10-1879845).

As an embodiment of the present disclosure, the pressurized microfiber filtering device includes: a pressurized housing 203 having an upper portion connected to a raw water supply port 201; the microfiber filter 204 provided inside the pressurized housing 203 to filter the raw water and having an upper end portion fixed to a flow holder 202; a porous permeable pipe 205 disposed in a lower portion of an inside of the microfiber filter 204 to pass filtered treatment water 401, the backwashing water 411, and the air 412; a filtered water and backwashing water distribution port 208 connected to a lower portion of the porous permeable pipe 205 to discharge filtered water and supplying the backwashing water 411; and an air supply pipe 207 connected to the lower portion of the porous permeable pipe 205 to supply the air 412.

A lower end portion of the microfiber filter 204 may be fixed to a fixing holder 206 positioned at a lower end portion of the inner space of the filtering device. Further, it may be fixed in a state of being fitted into the porous permeable pipe 205.

In the above, the microfiber filter 204 may be formed in a tubular shape.

Figure 4:
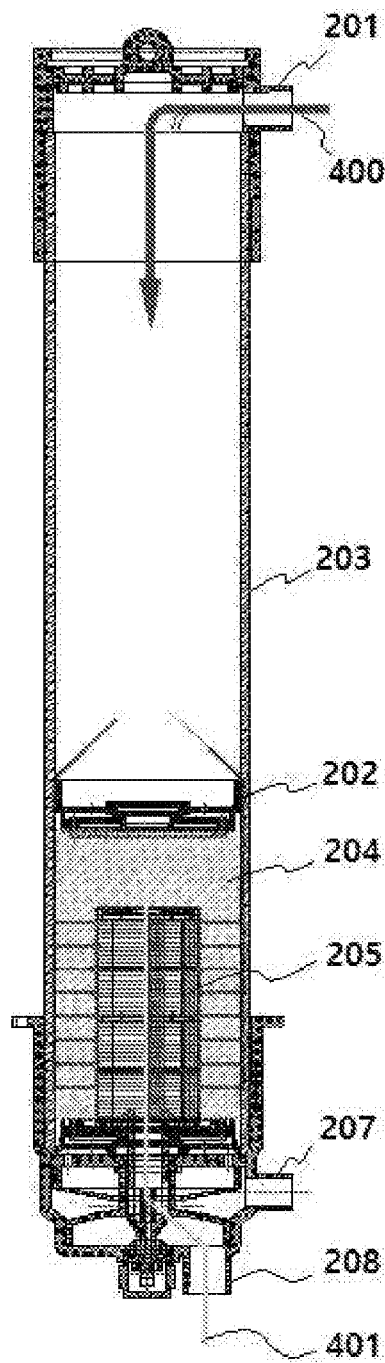
FIG. 4 is a cross-sectional view schematically illustrating a pressurized filtration process of the pressurized microfiber filtering device module including the microfiber filter coated with the coagulant as an embodiment of the present disclosure.

In the embodiment of the present disclosure, the pressurized filtration of step a) may be performed, as exemplarily illustrated in FIG. 4. That is, when pressure is applied while raw water 400 is supplied from the raw water supply port 201, the flow holder 202 is pressed downward, and the raw water 400 is filtered while the microfiber filter 204 is compressed. The filtered treatment water 401 passes through the porous permeable pipe 205 and is discharged through the filtered water and backwashing water distribution port 208.

Figure 5:
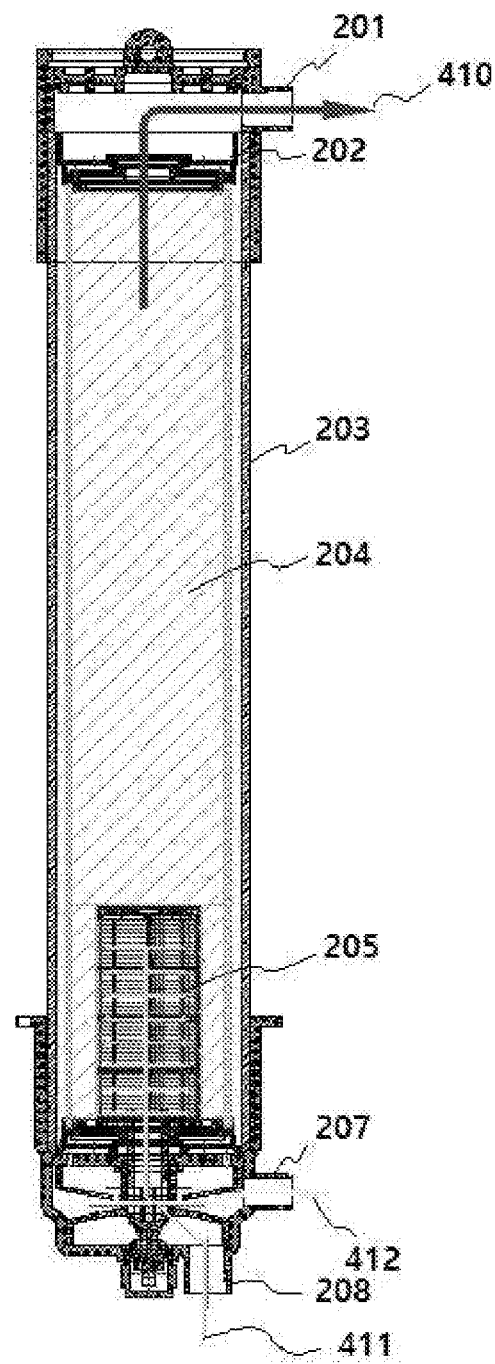
FIG. 5 is a cross-sectional view schematically illustrating a backwashing process of the pressurized microfiber filtering device module including the microfiber filter coated with the coagulant as an embodiment of the present disclosure.

The backwashing step of step b) may be performed, as exemplarily illustrated in FIG. 5. That is, the backwashing water 411 supplied through the filtered water and backwashing water distribution port 208 passes through the porous permeable pipe 205, and and then pushes up the flow holder 202 to the pressurized housing 203 while passing through the microfiber filter 204, and, at this time, the microfiber filter 204 is vertically aligned and is in a taut form to detach entrapped contaminant particles (simple contaminant particles and/or particles coagulated with the coagulant). Meanwhile, the backwashing air 412 subsequently injected vibrates the microfiber up, down, left, and right, and thus, the entrapped contaminant particles (simple contaminant particles and/or particles coagulated with the coagulant) are detached.

Figure 3:
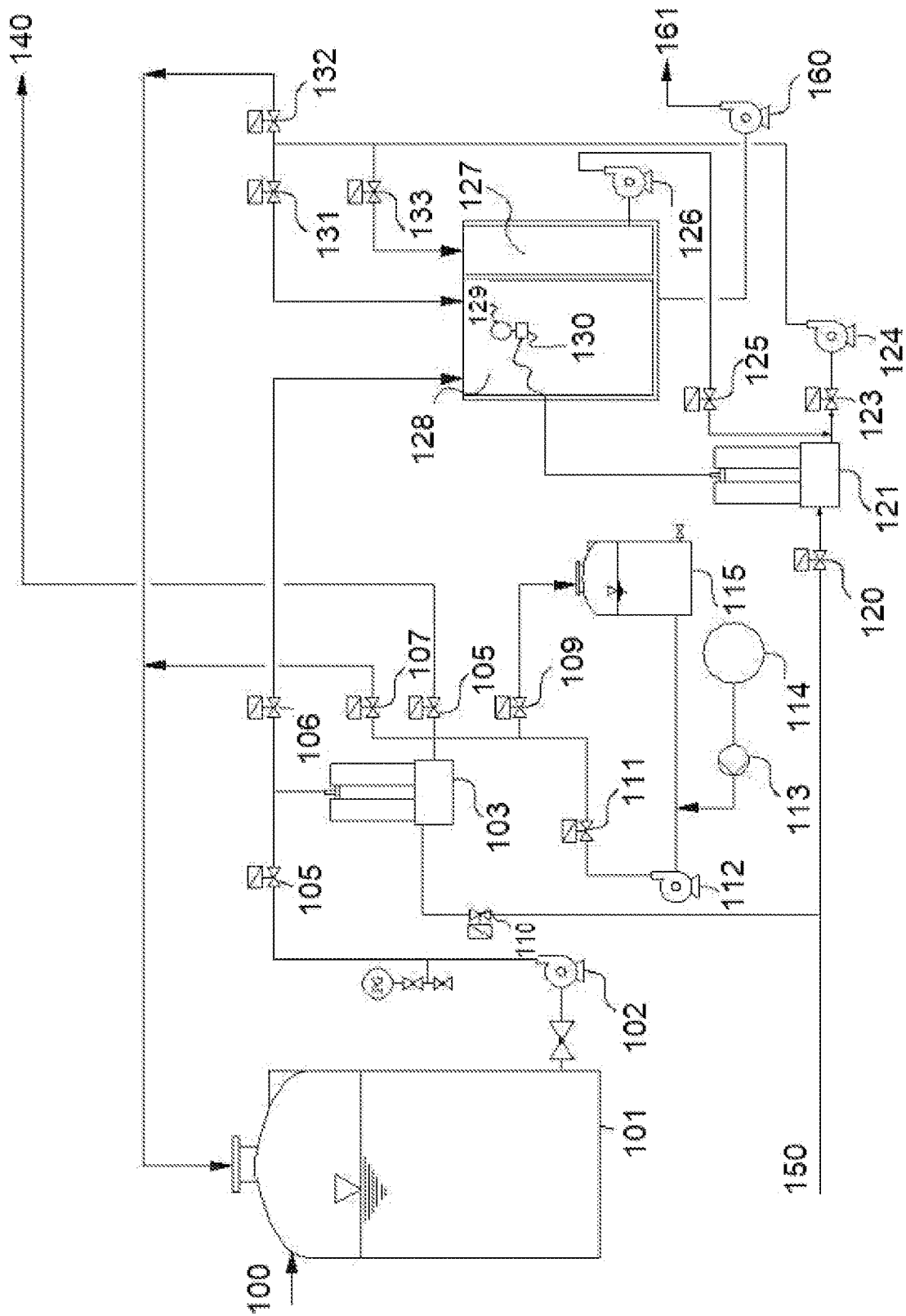
FIG. 3 is a view illustrating a water treatment system that can be applied to a physicochemical water treatment process using the microfiber filter coated with the coagulant according to the present disclosure.

In the embodiment of the present disclosure, as illustrated in FIG. 3, the treatment water 401 that has been subjected to the pressurized filtration treatment is transferred to a treatment storage tank 140, and some of the treatment water 401 is transferred to a backwashing water storing bath 115 to be used as the backwashing water, backwashing wastewater 410 resulted from the backwashing of the microfiber filter 204 is returned to a suction type filtration tank 128 (further, some of the backwashing wastewater 410 may be transferred to a raw water storing bath 101), and the backwashing wastewater 410 stored in the suction type filtration tank 128 is supplied to a suction type microfiber filtering device 121 to be filtered, and the suction-filtered treatment water is returned to the raw water storing bath 101, and some of the suction-filtered treatment water may be transferred to a suction type microfiber filtering device backwashing water storing bath 127 (further, some of the suction-filtered treatment water may be returned to the suction type filtration tank 128).

The backwashing wastewater 410 supplied from the suction type filtration tank 128 to the suction type microfiber filtering device 121 is supplied through a suction hose fixed to a suction hose holder 130 attached to a buoy 129. Therefore, the backwashing wastewater in the upper portion of the backwashing wastewater of the suction type filtration tank 128 is supplied.

That is, while the buoy 129 is mounted to an upper portion of the suction hose holder (including intake port) 130 so that the intake port moves upward and downward according to the water level of the suction type filtration tank 126 in the suction type filtration tank 128, the backwashing wastewater in the upper portion is supplied to the suction type microfiber filtering device 121.

In the embodiment of the present disclosure, as illustrated in FIG. 3, the supply of the raw water to the pressurized microfiber filtering device 103 is made by the raw water storing bath 101. Further, the supply of air to the pressurized microfiber filtering device 103 and the suction type microfiber filtering device 121 may be made by an air supply device 150.

In the embodiment of the present disclosure, the suction type microfiber filtering device 121 has the same structure as the pressurized microfiber filtering device 103, performs the backwashing in the same manner, and the backwashing wastewater used for the backwashing may be returned to the suction type filtration tank 128.

In the embodiment of the present disclosure, after the backwashing is completed, the coagulant in a liquid phase is coated on the surface of the microfiber, and then, as illustrated in FIG. 4, the pressurized filtration is performed. That is, as the filter layer is compressed due to the pressure of the introduced raw water 400, colloids and fine particles in the raw water 400 pass through pores between the microfiber coated with the coagulant and the zeta potential is reduced by the coagulant on the surface of the microfiber, and the filtration is achieved by the coagulation between the colloidal particles, adsorption on the surface of the coated fiber, and the pores. Coagulated flocs entrapped in the microfiber are detached from the microfiber during the backwashing processing and are returned to the suction type filtration tank 128, are concentrated by the suction type microfiber filtering device 121, and are dehydrated by a dehydrator 161, and then, are transferred to a waste storing bath in a dehydrated cake form.

In the embodiment of the present disclosure, as illustrated in FIG. 1, in the pressurized microfiber filtering device module, the microfiber filter 204 is fixed to the flow holder 202 and the fixing holder 206 in the pressurized housing 203. At this time, the porous permeable pipe 205 performs a function of fixing the lower end portion of the microfiber filter 204 together with the fixing holder 206 while being inserted into the lower end portion of the microfiber filter 204. When the backwashing water is injected to the pressurized microfiber filtering device module, the backwashing is performed in which the microfiber is vertically aligned due to the flotation of the flow holder 202 of the microfiber, and then, the subsequently injected backwashing air vibrates the microfiber up, down, left, and right so as to detach entrapped contaminant particles. After the backwashing of the microfiber is completed, the surface of the microfiber is coated with the coagulant as a backwashing pump and a coagulant injection metering pump are operated and the coagulant is injected into the microfiber module, and then, the backwashing pump and the metering pump stop the operation, and a pressure pump is operated to compress the coated microfiber to form a filtration layer, and the initial treatment water until the filtration layer is formed is returned to the coagulant storage tank 114. Thereafter, the treatment water is stored in the treatment water storage tank, and the continuous repeat operation is performed by repeating the backwashing after the filtration for a predetermined constant time.

In the embodiment of the present disclosure, the coagulant is stored in the coagulant storage tank 114, and may be supplied to a backwashing water supply pipe by a coagulant metering pump 113.

Specifically, after the backwashing is completed, the coagulant stored in the coagulant storage tank 114 is supplied to a backwashing water supply pipe by the coagulant metering pump 113, and a backwashing water transfer pump is simultaneously operated to supply a mixture of the backwashing water and the coagulant, and thus, the surface of the microfiber filter 204 is coated with the coagulant.

As the coagulant, a general-purpose coagulant used for the purpose of coagulation in a water treatment processing may be applied regardless of organic or inorganic.

Specifically, the coagulant may contain one or more selected from the group consisting of $Al_2(SO_4)_3 \cdot 16H_2O$, $Al_2(SO_4)_3 \cdot 18H_2O$, polyaluminum chloride (PAC), polyaluminum sulfate (PAS), polyaluminum sulfate silicate (PASS), and polyaluminum chloride silicate (PACS).

Further, the coagulant may be supplied in a form of a composition in which 2 to 10 parts by weight of one or more selected from the group consisting of polydopamine and dopaminemethacrylamide (PDMA) and 20 to 40 parts by weight of water are mixed on the basis of 100 parts by weight of one or more selected from the group consisting of $Al_2(SO_4)_3 \cdot 16H_2O$, $Al_2(SO_4)_3 \cdot 18H_2O$, polyaluminum chloride (PAC), polyaluminum sulfate (PAS), polyaluminum sulfate silicate (PASS), and polyaluminum chloride silicate (PACS). The composition may be in a form of solution or in a form of slurry.

DESCRIPTION OF SYMBOLS

103: microfiber filtering device, 102: pressure pump, 112: backwashing pump, 105: raw water opening/closing valve, 106: backwashing wastewater opening/closing valve, 107: initial treatment water opening/closing valve, 108: treatment water opening/closing valve, 109: backwashing water replenishing valve, 110: backwashing air opening/closing valve, 111: backwashing water opening/closing valve, 113: coagulant metering pump, 114: backwashing air opening/closing valve, 150: suction type filtration tank (128), 129: buoy, 130: suction hose holder, 127: suction type microfiber filtering device backwashing water storing bath, 121: suction type microfiber filtering device, 124: suction type filtration pump, 126: backwashing pump, 123: suction opening/closing valve, 131: suction type microfiber filtering device initial treatment water opening/closing valve, 133: suction type filtering device backwashing water replenishing opening/closing valve, 132: suction type filtering device treatment water opening/closing valve, 125: suction type microfiber filtering device backwashing water opening/closing valve, 120: suction type microfiber filtering device backwashing air opening/closing valve, 160: concentrated sludge transfer pump, 201: raw water supply port, 202: flow holder, 203: pressurized housing, 204: microfiber filter, 205: porous permeable pipe, 206: fixing holder, 207: air supply pipe, 208: filtered water and backwashing water distribution port, 400: raw water, 401: filtered treatment water, 410: backwashing wastewater, 411: backwashing water, 412: air

What is claimed is:

1. A physicochemical water treatment process using a microfiber filter coated with a coagulant, the process comprising:
   a) performing a pressurized filtration by supplying raw water to an upper portion of a pressurized microfiber filtering device including a microfiber filter coated with a coagulant;
   b) backwashing the microfiber filter by supplying backwashing water and air from a lower portion of the microfiber filtering device; and
   c) after the backwashing of the microfiber filter is completed, coating the microfiber filter with the coagulant by supplying the coagulant together with the backwashing water,
   wherein the pressurized microfiber filtering device includes:
      a pressurized housing having an upper portion connected to a raw water supply port;
      the microfiber filter provided inside the pressurized housing to filter the raw water and having an upper end portion fixed to a flow holder;
      a porous permeable pipe disposed in a lower portion of an inside of the microfiber filter to pass filtered treatment water, backwashing water, and air;
      a filtered water and backwashing water distribution port connected to a lower portion of the porous permeable pipe to discharge filtered water and supplying the backwashing water; and
      an air supply pipe connected to the lower portion of the porous permeable pipe to supply air,
   treatment water that has been subjected to a pressurized filtration processing is transferred to a treatment water storage tank, and some of the treatment water is transferred to a backwashing water storing bath to be used as backwashing water,
   backwashing wastewater resulted from the backwashing of the microfiber filter is transferred to a suction type filtration tank, and the backwashing wastewater stored in the suction type filtration tank is supplied to a suction type microfiber filtering device to be filtered, and
   suction-filtered treatment water is returned to a raw water storing bath, and some of the suction-filtered treatment water is transferred to a suction type microfiber filtering device backwashing water storing bath.

2. The physicochemical water treatment process according to claim 1, wherein the suction type microfiber filtering device has a same structure as the pressurized microfiber filtering device, the same backwashing is performed, and backwashing wastewater is transferred to the suction type filtration tank.

3. The physicochemical water treatment process according to claim 2, wherein a buoy is mounted on an upper portion of an intake port of the suction type filtration tank so that the intake port is moved upward and downward according to a water level of the suction type filtration tank.

4. The physicochemical water treatment process according to claim 1, wherein when performing the backwashing, the microfiber filter is vertically aligned due to flotation of the flow holder, and then, the microfiber filter vibrates up, down, left, and right by the injected backwashing air so as to detach entrapped contaminant particles.

5. The physicochemical water treatment process according to claim 1, wherein, after the backwashing is completed, the coagulant stored in a coagulant storage tank is supplied to a backwashing water supply pipe by a coagulant metering pump, and a backwashing water transfer pump is simultaneously operated to supply a mixture of backwashing water and a coagulant, and thus, a surface of the microfiber filter is coated with the coagulant.

\* \* \* \* \*